United States Patent [19]

Suga et al.

[11] Patent Number: 4,672,397

[45] Date of Patent: Jun. 9, 1987

[54] ON-DEMAND TYPE INK-JET PRINT HEAD HAVING AN AIR FLOW PATH

[75] Inventors: Michihisa Suga; Mitsuo Tsuzuki, both of Tokyo, Japan

[73] Assignee: NEC Corporation, Japan

[21] Appl. No.: 646,376

[22] Filed: Aug. 29, 1984

[30] Foreign Application Priority Data

Aug. 31, 1983 [JP] Japan ............................... 58-159821
Aug. 31, 1983 [JP] Japan ............................... 58-159823

[51] Int. Cl.⁴ ............................................. G01D 15/18
[52] U.S. Cl. ............................................. 346/140 R
[58] Field of Search .................................. 346/140, 75

[56] References Cited

U.S. PATENT DOCUMENTS 1,709,926 4/1929 Weaver ................................ 358/75
4,002,230 1/1977 Schweppe ......................... 346/75 X
4,106,032 8/1978 Miura ................................. 346/140
4,228,442 10/1980 Krull .................................. 346/140

OTHER PUBLICATIONS

Dollenmayer, W. L., Ink Jet Nozzle Design, IBM TDB, vol. 22, No. 6, Nov. 1979, pp. 2333–2334.

*Primary Examiner*—Joseph W. Hartary
*Attorney, Agent, or Firm*—Laff, Whitesel, Conte & Saret

[57] ABSTRACT

An on-demand type ink-jet printer with a thin cylindrical tip end coaxially projecting into a cylindrical passageway. Ink droplet formation is controlled by a piezoelectric transducer. A stream of air is forced through an annular space formed between the tip end and passageway. The air pressures acting on a meniscus at the tip end is controlled by the position of the tip end within the passageway. A solvent for the ink saturates a porous member surrounding the end of the passageway to control drying of the ink.

10 Claims, 5 Drawing Figures

ON-DEMAND TYPE INK-JET PRINT HEAD HAVING AN AIR FLOW PATH

This invention relates to an on-demand type ink-jet print head, and more particularly to an on-demand type ink-jet print head having an air flow path, as auxiliary means for ejecting ink droplets.

The U.S. Pat. No. 4,106,032 entitled "APPARATUS FOR APPLYING LIQUID DROPLETS TO A SURFACE BY USING A HIGH SPEED LAMINAR AIR FLOW TO ACCELERATE THE SAME," issued to Miura, et al., shows an on-demand type ink-jet printhead having an air flow path as auxiliary means for increasing the velocity of a flying ink-droplet in order to obtain a clear picture. However, in a conventional on-demand type ink-jet print head having an air flow path, it is difficult to eject ink droplets which fly with a stable direction and velocity.

It is, therefore, an object of this invention to provide an on-demand type ink-jet print head having an air flow path in which ink droplets are stably ejected.

According to this invention, an on-demand ink-jet print head has an ink chamber; a piezoelectric element; a nozzle orifice; and an air flow path. The nozzle orifice has a thin wall and is provided in the air flow path.

Other features and advantages of this invention will be apparent from the following description of preferred embodiments of this invention taken in conjunction with the accompanying drawings, wherein.

Before the description of the embodiments of this invention, conventional on-demand type ink-jet print heads will be described with reference to FIGS. 1 and 2.

Figure 1:
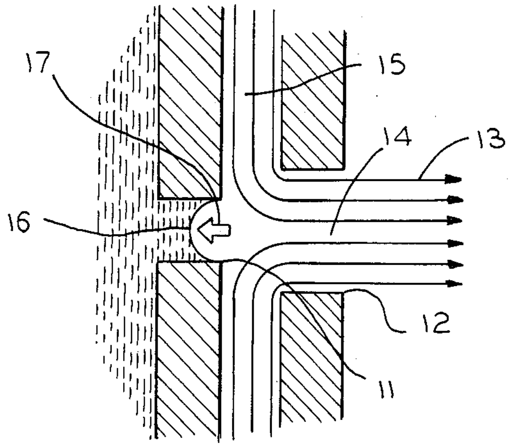
FIG. 1 PRIOR ART
FIGS. 1 and 2 are schematic sectional views of conventional ink-jet print heads.

Referring to FIG. 1, a first conventional example of an ink-jet head has a first nozzle 11 and a second nozzle 12 having an opening facing the first nozzle 11. Air flow 13 is caused to flow out of the second nozzle 12 and the ejection speed of an ink droplet leaving the nozzle is greatly increased when it is carried on this air flow. However, it was necessary to first drive the ink droplet into the inside 14 of the nozzle.

In order to drive the ink droplet in this, a pulse pressure is applied to the ink by using an electrical mechanical conversion means such as a piezoelectric element. When this pulse pressure was too small for the ink pushed out of the first nozzle 11 to reach the inside 14 of the second nozzle, it was impossible to form a stable ink droplet under the influence of a complicated movement of air flow between the two nozzles.

Therefore, there has been a limitation in the formation of a small volume ink droplet responsive to a reduced pulse pressure. Furthermore, the air which has passed through the passageway 15 between the two nozzles is abruptly accelerated in the inside of the second nozzle 12. Therefore, the ink meniscus 16 in the first nozzle was subjected to a force which forced it back toward the inside of the nozzle 11 as indicated by the arrow 17. As a result, air disadvantageously flowed into the ink, and even the pulse pressure was not able to eject the ink. In order to prevent such a state, when air flow was used, it was necessary to apply a fixed pressure to the ink so that the ink meniscus 16 can be located stably within the inside of the first nozzle 11.

Figure 2:
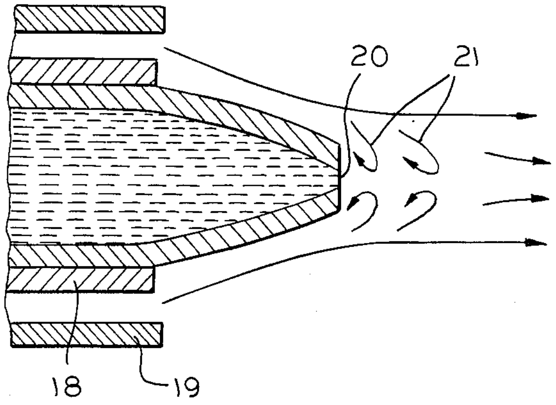
FIG. 2 PRIOR ART

Referring to FIG. 2, in a second conventional example of an ink jet printer, a pipe for air supply 19 is attached to the outside of a piezoelectric element 18 incorporating an ink-jet head for blowing air from the end onto a recording paper. It is also possible to heighten the velocity of a flying ink droplet by using air flow as an auxiliary means after the ejection of an ink droplet. However, since the opening is larger than the opening of the first example of FIG. 1, it was necessary to supply a large amount of air in order to form a sufficiently high-speed air flow. As a result, a large-sized pump was required which brought about the problem of increasing installation cost and noise.

In addition, as is shown in FIG. 2, when a high-speed air flow moves at the fore end of the head, a swirl 21 of air flow is produced in front of the nozzle orifice 20, to form a turbulent flow. This turbulent flow made the flying direction and velocity of an ink drop unstable. An ejection of an ink drop was difficult when the volume of an ink drop was too small. Therefore, in order to obtain a stable ejection of an ink drop, it was necessary to increase the ejection energy and to drive an ejected droplet to a part 22 which is away from the nozzle. It was difficult to so increase energy in cases where the volume of ink small was too small.

Figure 3:
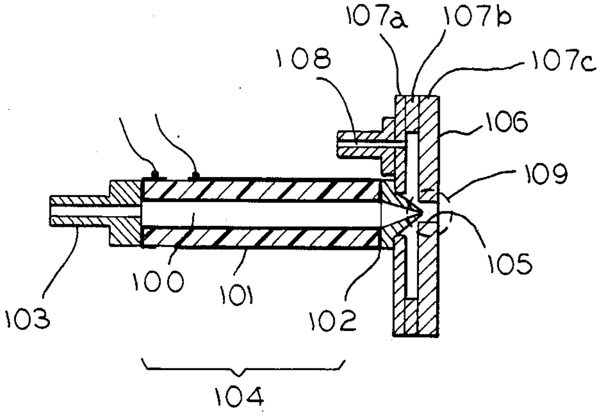
FIG. 3 is a schematic sectional viw of a first embodiment of this invention.
Figure 4:
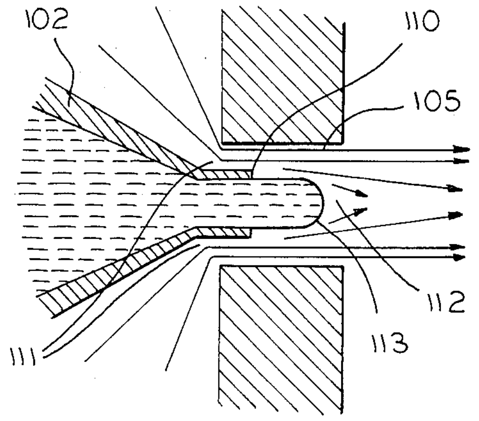
FIG. 4 is a partially enlarged sectional view of the first embodiment shown in FIG. 3.

Referring to FIGS. 3, 4, a first embodiment of this invention comprises an ink-jet head 104 composed of an ink chamber 100, a cylindrical piezoelectric element 101 on the ink chamber 100, a nozzle 102 fixed to one end of the ink chamber, and a supply passageway 103 fixed to the other end of the piezoelectric element for introducing ink from a tank outside, and air flow formation means 106 having an aperture or guide passageway 105 for causing pressurized air in the vicinity of the nozzle 102 to flow out toward a recording paper. The air flow formation means 16 is composed of laminated plate members 107*a*, 107*b* and 107*c*. The pressurized air is supplied from an external pump (not shown) throgh an air inlet 108 to the vicinity of the nozzle.

The wall of the orifice 110 (FIG. 4) of the nozzle 102 is made extremely thin and the orifice 110 is arranged to be located inside of the guide passageway 105 of the air flow. The pressurized air introduced into the vicinity of the nozzle is abruptly accelerated in the aperture or inlet 111 of the guide passageway 105 to form an air flow directed toward the recording paper. Because there is an abrupt acceleration of air in the aperture or inlet 111 of the passageway, a large difference in pressure occurs due to the inertia effect in the inlet 111 of the passageway. Most of the pressure of the pressurized air introduced to the vicinity of the nozzle forms a difference in pressure in the inlet 111. The velocity of air flow is approximately uniform around the periphery of the orifice 110 inside the guide passageway 105. Therefore, the generation of pressure due to the inertia effect can be disregarded, but the generation of pressure due to the viscosity effect of the air is to be recognized. However, this pressure due to viscosity effect is so small, as compared with the pressure due to inertia effect in the aperture or inlet 111 of the passageway, that it can effectively be disregarded.

In the vicinity of the outlet 112 of the guide passageway 105, the section of the passageway is wider than it is in the vicinity of the inlet because the outlet has no nozzle orifice 110. The high-speed air flow passing in the periphery of the orifice 110 reduces the speed of the air in the vicinity of the outlet 112. This brings about pressure due to the inertia effect in the vicinity of the outlet 112. However, this inertia caused pressure is directed reversely to the pressure due to viscosity effect in the periphery of the orifice 110.

It has been experimentally confirmed that it is possible to make the air pressure in the periphery of the orifice 110 approximately equal to atmospheric pressure by offsetting the two pressures (inertia and viscosity) against each other. While it is needless to say that this offsetting effect varies depending upon the location of the orifice 110 in the aperture or guide passageway 105, it was confirmed that the offsetting effect is obtained sufficiently by disposing the orifice within the section equivalent to the second and third quarters of the entire length of the aperture or guide passageway 105. As a result, it is possible for the ink meniscus inside the orifice to remain almost stably within the inside of the orifice without being forced further inwardly or being forced outwardly.

Thus, this embodiment dispenses with the need for a pressurizing system for moving the ink through an ink tank as in the first conventional example. This embodiment enables the realization of a simple and a low-cost device.

Further, the wall of the nozzle orifice 110 is made extremely thin as is shown in FIG. 4. Therefore, even when pulse pressure forces the ink meniscus 113 to the outside of the orifice, as is shown in the figure, it is possible for the air flow to pass uniformly around the periphery of the orifice and the ink meniscus without causing a large turbulence. As a result, the ink meniscus 113 may always be stably pushed out, which enables a much stabler ink drop formation than is possible in the second conventional example.

In addition, as the ink mensicus which has been pushed out is subject to a force acting in the direction which pulls it out of the orifice due to viscosity resistance cause by the air flow in the periphery. Even when the ink meniscus itself is pushed ut, it has insufficient kinetic energy to separate itself from the orifice. Thus, it is possible for the ink to be ejected as a drop of ink and to be carried in the air flow.

The wall 110 is preferably as thin as possible; however, on the other hand, it is also preferable to make it as thick as possible from the viewpoint of manufacturing technique. As a result of measurement of ink ejection properties which has been made while varying the wall thickness of the orifice, it was experimentally confirmed that, for example, when the inner diameter of a nozzle orifice is 50 $\mu$m, an almost stable ink droplet ejection is possible if the outer diameter is not greaer than approximately 75 $\mu$m. Experimentation also made it clear that the permissible range of outer diameter variations varies approximately in proportion to the variation of the inner diameter. Good ink ejection is possible when the ratio of the inner diameter to the outer diameter does not exceed 1.5.

As described above, an ejection of an extremely minute droplet, which was impossible in the prior art, is enabled due to the effect of the viscosity resistance of the ink meniscus after being pushed out. Good half-tone recording is enabled simply by varying the volume of a droplet.

Figure 5:
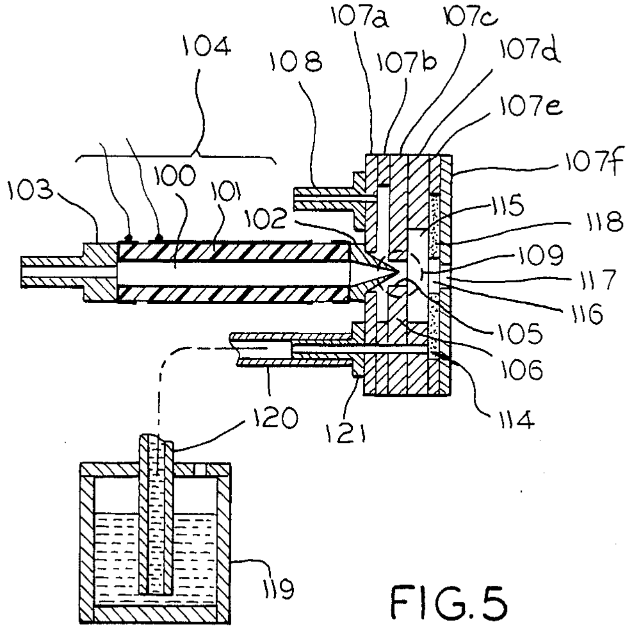
FIG. 5 is a schematic sectional view of a second embodiment of this invention.

Referring to FIG. 5, in a second embodiment, a porous member 114 is dispoed in a position opposite the nozzle 102. In a porous member 101 opposing the nozzle 102, and a plate member **107*f* on the outer wall part are formed bores 116 and 117 through which ink may pass before the ink droplet is ejected from the nozzle 102**.

The same liquid that is the prime solvent for the ink in the nozzle 102 fills the porous member 114. This liquid evaporates from the surface 118 of the porous member 114. The amount of evaporation varies in accordance with the steam pressure of the prime solvent for ink in the chamber 115. Evaporation stops when the solvent in member 114 reaches the saturated vapor pressure. Actually, as the vapor diffuses to the outside, through the through bores 116 and 117, evaporation from the surface 118 of the porous member continues slightly. The prime solvent for the ink is supplied due to capillary action on the surface 118 of the porous member. As a result, the prime solvent for the ink is stored in the container 119 and is drawn to the surface 118 of the porous member 114 through a conduit 120 and a connector pipe 121. In this way, the space close to the nozzle 102 always contains vapor of the prime solvent for ink, with a high steam pressure which is close to the saturation value, and, thus, the ink in the nozzle 102 never dries.

Furthermore, there always is some high density vapor of the prime solvent for ink in the space close to the nozzle, whether or not the ink-jet operation is being carried out. The ink drying prevention function works adequately at all times of operation. Thus, there is a remarkable heightened reliability of ink-jet recording.

Those who are skilled in the art will readily perceive how to modify the invention. Therefore, the appended claims are to be construed to cover all equivalent structures which fall within the true scope and spirit of the invention.

What is claimed is:

1. An on-demand ink-jet printing head comprising a passageway for pressurized air, said passageway being defined by an inside cylindrical wall; a nozzle extending into and being coaxially positioned for at least a part of its length within said cylindrical wall, thus forming a space with an annular cross section between said cylindrical wall and said nozzle, with an orifice of said nozzle inside said cylindrical wall; means for directing a flowing gaseous stream through said annular cross section, past said orifice, an end of said nozzle which is within said cylindrical wall, and out said passageway formed by said cylindrical wall, said flowing gaseous stream creating an inverse pressure reactions within said passageways responsive to inertia and viscosity, of said stream; means for locating said nozzle within said passageway at a position in the area defined by the second and third quarters of the length of said passageway for balancing said inverse pressures in order to control the formation of a meniscus of ink in the orifice area of said nozzle, said balanced pressures resulting in approximatey atmospheric pressure which is achieved by offsetting said inertia and viscosity of said stream; and piezoelectric transducer means for selectively ejecting ink droplets from said nozzle orifice and into said flowing gaseous stream for delivery of said droplets toward a printed medium.

2. The on-demand ink-jet printer of claim 1 wherein said nozzle has a thin cylinderical wall in the orifice part where it extends coaxially into said part of the cylindrical wall.

3. The on-demand ink-jet printer of claim 2 wherein there is a solvent for said ink, and porous means positioned near the outer end of said passageway, and means for at least partially saturating said porous-means with said solvent for precluding a drying of said ink in the vicinity of said passageway.

4. The on-demand ink-jet printer of claim 2 wherein said thin cylindrical wall of said nozzle has an inside diameter to outside diameter ratio which is equal to or less than 1:1.5.

5. The on-demand ink-jet printer of claim 2 wherein the inside diameter of said nozzle forms the orifice in the order of approximately 50 $\mu$m.

6. The on-demand ink-jet printer of claim 2 wherein the outside diameter of said nozzle forms the orifice in the order of approximately 75 $\mu$m.

7. The on-demand ink-jet printer of claim 1 wherein there is a solvent for said ink, and porous means positioned near the outer end of said passageway, and mens for at least partially saturating said porous-means with said solvent for precluding a drying of said ink in the vicinity of said passageway.

8. The on-demand ink-jet of claim 7 wherein said porous material surrounds the outlet end of said passageway through which said flowing gaseous stream carries said droplets as they are delivered toward said medium.

9. The on-demand ink-jet printer of claim 1 wherein said nozzle has a thin cylinderical wall in the part where it extends coaxially into said part of the cylindrical wall.

10. The on-demand ink-jet printer of claim 1 wherein there is a solvent for said ink, and porous means positioned near the outer end of said passageway, and means for at least partially saturating said porous-means with said solvent for precluding a drying of said ink in the vicinity of said passageway.

* * * * *